United States Patent [19]

Sackett

[11] Patent Number: 4,523,992

[45] Date of Patent: Jun. 18, 1985

[54] FILTER ASSEMBLY

[76] Inventor: James T. Sackett, 27325 Gail, Warren, Mich. 48093

[21] Appl. No.: 616,241

[22] Filed: Jun. 1, 1984

[51] Int. Cl.³ .................. B01D 25/04; B01D 25/30; B01D 35/02
[52] U.S. Cl. ................... 210/232; 210/434; 210/456; 210/463; 210/497.01
[58] Field of Search .......... 210/130, 232, 434, 456, 210/463, 497.01, 460

[56] References Cited

U.S. PATENT DOCUMENTS

| | | | |
|---|---|---|---|
| 799,910 | 8/1905 | Hernan | 210/463 |
| 2,557,279 | 6/1951 | Greenberg | 210/232 |
| 2,687,216 | 8/1954 | Shelton | 210/94 |
| 2,907,466 | 10/1959 | Beddow | 210/456 |
| 3,016,147 | 1/1962 | Cobb | 210/456 |
| 3,109,809 | 11/1963 | Verrando | 210/456 |
| 3,120,491 | 2/1964 | Kincaid | 210/463 |
| 3,381,822 | 5/1968 | Martin | 210/434 |
| 3,464,561 | 9/1969 | Wrotnowski | 210/232 |
| 3,487,944 | 1/1970 | Tucker | 210/463 |
| 3,682,386 | 8/1972 | Herman et al. | 210/266 |
| 3,762,562 | 10/1973 | Okuniewski et al. | 210/460 |
| 4,123,361 | 10/1978 | Marschman | 210/232 |
| 4,174,282 | 11/1979 | Butterworth | 210/232 |

*Primary Examiner*—Ernest G. Therkorn
*Attorney, Agent, or Firm*—Gifford, VanOphem, Sheridan, Sprinkle & Nabozny

[57] ABSTRACT

The present invention provides a filter assembly adapted to be connected the water discharge hose of a washing machine. The filter assembly comprises a body having a tubular inlet member and a tubular outlet member which are coaxial but axially spaced from each other. A plurality of circumferentially spaced fins are secured to and extend outwardly from the tubular members and the inlet member is connected to the water discharge hose from the washing machine. A tubular mesh filter element is disposed around the fins and has one end secured to the inlet member and its other end secured to the outlet member. In addition, a cone is positioned in between the inlet and outlet members which diverts the water flow from the water discharge hose outwardly towards the filter element.

9 Claims, 5 Drawing Figures

FILTER ASSEMBLY

BACKGROUND OF THE INVENTION

I. Field of the Invention

The present invention relates generally to filter assemblies and, more particularly, to a filter assembly adapted to be fluidly connected to the water discharge hose of a washing machine.

II. Description of the Prior Art

In washing machines of the type commonly employed in homes, the dirty water from the washing machine is discharged through a water discharge hose and to a laundry tub or other plumbing in the home. The water discharge from the washing machine is typically laden with lint and other debris which is oftentimes simply flushed down the plumbing system. After a period of time, this debris and lint lines the pipes in the plumbing thus clogging the pipes and necessitating expensive cleaning or repair of the plumbing system.

In order to prevent the lint from entering the plumbing system, there have been a number of previously known lint filters which are adapted to be fluidly connected to the water discharge hose from the washing machine. These previously known lint filters typically comprise a filter bag or filter element which is simply attached to the water discharge hose. Consequently, water flow through the discharge hose flows into the interior of the bag and through the bag whereupon the lint and other debris are removed so that only relatively lint-free water then enters the plumbing system. Many of these previously known devices, however, use a large mesh filter which traps less than 50% of the link discharged. Such a large mesh is necessary to prevent bursting of the bag or detachment of the bag from the discharge hose.

A primary disadvantage of these previously known lint filters is that the filter bag becomes clogged with lint and other debris after a period of time. Continued usage of the filter assembly after it has been clogged results in either bursting of the filter assembly or a backup of the water flow from the washing machine.

A still further disadvantage of these previously known devices is that they frequently become detached from the water hose and/or spray water outside the laundry tub.

SUMMARY OF THE PRESENT INVENTION

The present invention provides a filter assembly or lint filter which overcomes all of the above disadvantages of the previously known devices.

In brief, the filter assembly of the present invention comprises a body having a tubular inlet member and a tubular outlet member which are coaxial with each other but axially spaced from each other. The inlet member is fluidly connected to the water discharge hose from the washing machine.

A plurality of circumferentially spaced fins are secured to and extend outwardly from the tubular members. A tubular filter element constructed to a stretchable mesh material, such as a portion of a nylon stocking, is then positioned around the fins which space the filter element away from the tubular members. One end of the filter element is secured to the inlet member while the other end of the filter element is secured to the outlet member. In doing so, a filter chamber is formed in the space between the fins and tubular members and the filter element.

A conical member is positioned in between the inlet and outlet members so that its apex is directed towards the inlet member. This conical member thus disperses fluid flow from the washing machine discharge hose outwardly towards the filter element so that the filter element removes lint and other debris from the water. A portion of the cleaned water then either passes through the filter element and/or through the outlet member and to the plumbing system in the desired fashion.

BRIEF DESCRIPTION OF THE DRAWING

A better understanding of the present invention will be had upon reference to the following detailed description, when read in conjunction with the accompanying drawing wherein like reference characters refer to like parts throughout the several views, and in which.

DETAILED DESCRIPTION OF A PREFERRED EMBODIMENT OF THE INVENTION

Figure 1:
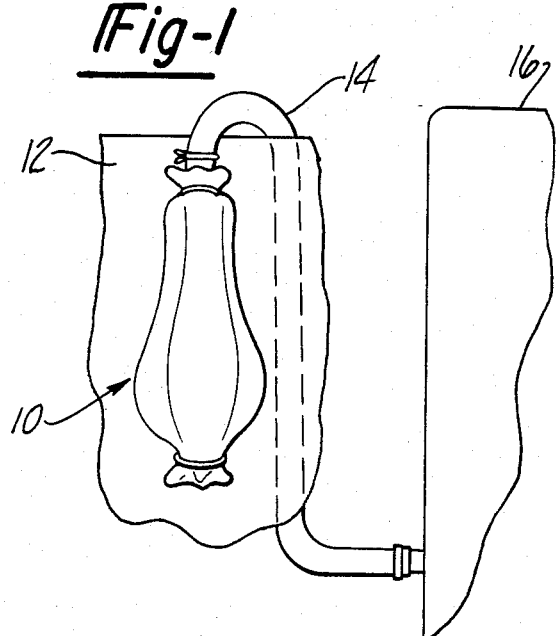
FIG. 1 is a fragmentary side view illustrating a preferred embodiment of the present invention.

With reference first to FIG. 1, a preferred embodiment of the filter assembly or lint filter 10 of the present invention is thereshown positioned within a laundry tub 12 of the type commonly found in laundry rooms of homes, apartments and the like. As will be subsequently described in greater detail, the filter 10 is fluidly coupled to the water discharge hose 14 of a washing machine 16.

Figure 3:
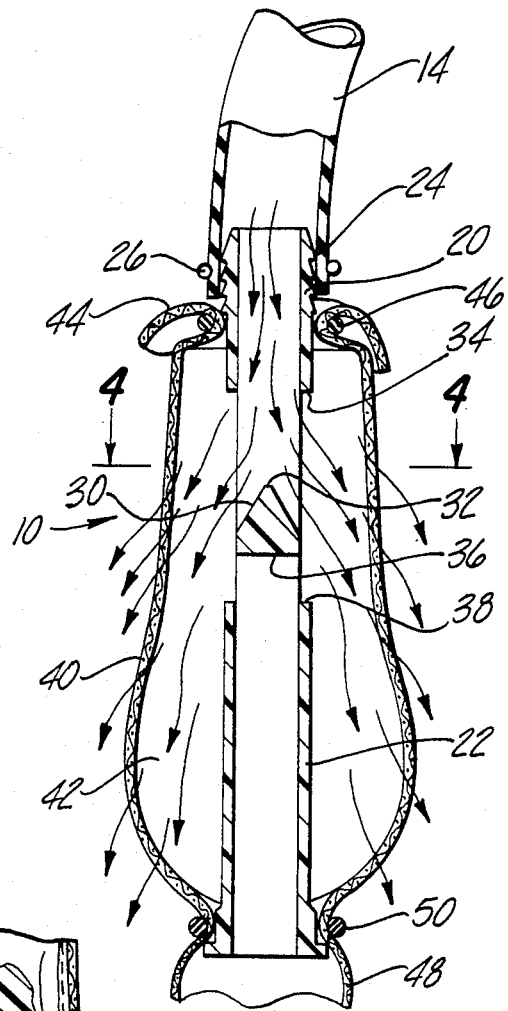
FIG. 3 is a longitudinal sectional view illustrating the preferred embodiment of the present invention.
Figure 2:
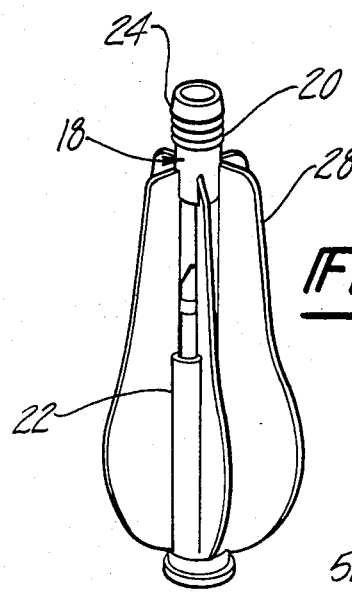
FIG. 2 is an elevational view of the preferred embodiment of the present invention and with parts removed for clarity.

With reference now to FIGS. 2 and 3, the filter 10 comprises an elongated body 18 having a tubular inlet member 20 at its upper end and a tubular outlet member 22 at its lower end. The tubular members 20 and 22 are generally coaxial with each other but are axially spaced from each other as best shown in FIG. 3. In addition, the inlet tubular member 20 includes a plurality of axially spaced annular ridges 24 around its outer periphery so that, upon insertion of the inlet tubular member 20 into the water discharge hose 14, the ridges 24 sealingly engage the inner periphery of the hose 14. A conventional hose clamp 26 (FIG. 3) is preferably then used to secure the hose 14 to the inlet member 20.

Figure 4:
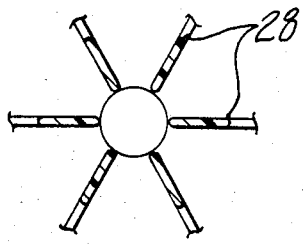
FIG. 4 is a cross-sectional view taken substantially along line 4—4 in FIG. 3 and with parts removed for clarity.

With reference now to FIGS. 2 and 4, the body 18 further includes a plurality of circumferentially spaced fins 28 which extend between and outwardly from the inlet member 20 and outlet member 22. In the preferred embodiment of the invention, the body 18 includes six fins 28 and these fins are equidistantly circumferentially spaced from each other and are substantially identical to each other.

With reference now particularly to FIGS. 2 and 3, the body 18 further includes a conical member 30 coaxial with the positioned in between the inlet member 20 and outlet member 22. As best shown in FIG. 3, the conical member 30 is oriented so that its apex 32 faces towards but is spaced downwardly from the lower end 34 of the inlet member 20 while its base 36 is positioned upwardly from the upper end 38 of the outlet member 22. The purpose of the conical member 30 will be subsequently described in greater detail.

In the preferred embodiment of the invention, the entire body, i.e. the inlet member 20, outlet member 22, fins 28 and conical member 30, are of a one piece plastic construction and formed by injection molding. Consequently, the body 18 is relatively inexpensive to manufacture and yet durable in use.

Figure 5:
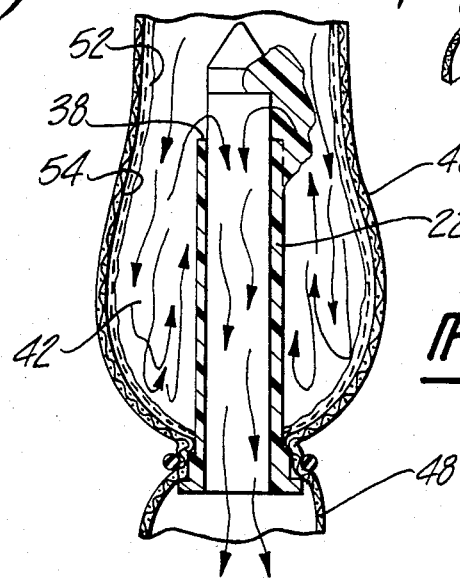
FIG. 5 is a fragmentary sectional view illustrating a portion of the preferred embodiment of the present invention.

With reference now to FIGS. 3 and 5, a tubular filter element 40 is positioned over and around the fins 28 thus forming a filter chamber 42 in the space between the fins 28 and the filter element 40. The upper end 44 of the filter element 40 is attached to the outer periphery of the inlet member 20 by an O-ring 46 while the other end 48 of the filter element 40 is secured to the outer periphery of the outlet member 22 by an O-ring 50. The filter element 40, furthermore, is constructed from a stretchable mesh material, such as a portion of a nylon stocking.

With reference now particularly to FIG. 3, in operation and assuming that the element 40 is clean, water flow from the hose 40 flows through the inlet member 20 and against the conical member 30. The conical member 30 then disperses the water flow laden with lint and other debris into the inlet chamber 42 and against the filter element 40. Since the filter element 40 is relatively clean, the filter element 40 removes lint and other debris contained within the water while the clean water passes through the filter element 40 and into the laundry tub (FIG. 1) in the desired fashion.

With reference now particularly to FIG. 5, after a period of time a layer 52 of lint and other debris forms on the inner periphery 54 of the filter element 40 and impedes the flow of clean water through the filter element. When this occurs, the water flow from the filter chamber 42 passes through the upper end 38 of the outlet member 22 and through the outlet member 22 to the laundry tub 12 (FIG. 1) in the desired fashion. Furthermore, even when the interior surface 54 of the filter element 40 is covered by the layer 52 of lint and other debris, filtering of the wash water still occurs since the conical member 30 forces the lint and debris contained within the wash water outwardly towards the filter element 40 by centrifugal force so that only relatively clean water passes through the outlet member 22 and to the laundry tub 12. In addition, the lint and debris tends to gravitate towards the lower portion of the filter chamber 42 and thus is spaced downwardly from the upper end 38 of the outlet member 22. For this reason, the radial width of the fins 28 adjacent the outlet member 22 is greater than adjacent the inlet member 20 to form a large volume debris collection chamber at the bottom of the filter assembly.

Water flow through the outlet member 22 not only prevents bursting of the filter element 40 but also provides an indication that the filter element should be cleaned or replaced.

From the foregoing, it can be seen that the present invention provides an improved filter assembly particularly suited for filtering the water from the discharge hose of a washing machine. Having described by invention, however, many modifications thereto will become apparent to those skilled in the art to which it pertains without deviation from the spirit of the invention as defined by the scope of the appended claims.

I claim:

1. A filter assembly for use with a water discharge hose of a washing machine comprising:
    a body having an inlet tubular member and an elongated outlet tubular member, said members being substantially coaxial and axially spaced from each other, each tubular member having an inner end which faces the inner end of the other tubular member, and an outer end,
    a plurality of circumferentially spaced fins secured to and extending outwardly from said tubular members,
    means for fluidly connecting said outer end of said inlet tubular member to the discharge hose,
    a tubular filter element,
    means for attaching one end of said filter element to said inlet member and the other end of said filter element adjacent said outer end of said outlet tubular member so that said filter element encloses said fins and so that said inner end of said outlet member is positioned at a midpoint of said filter element, and
    means positioned between said inner ends of tubular members for diverting fluid flow from said outer end towards said inner end of said inlet member radially outwardly around the inner end of said outlet member and toward said filter element.

2. The invention as defined in claim 1 wherein said diverting means comprises a conical member having its apex pointing towards said inlet member.

3. The invention as defined in claim 2 wherein said tubular members, said conical member and said fins are of a one piece construction.

4. The invention as defined in claim 3 wherein said tubular members, said conical member and said fins are constructed of plastic.

5. The invention as defined in claim 1 wherein said tubular members are tubular and cylindrical in shape.

6. The invention as defined in claim 5 wherein the radial width of said fins adjacent said outlet member is greater than the radial dimension of said fins adjacent said inlet member.

7. The invention as defined in claim 1 wherein said filter element comprises a stretchable mesh material.

8. The invention as defined in claim 7 wherein said filter element comprises a portion of a nylon stocking.

9. The invention as defined in claim 1 wherein said attaching means comprises a resilient ring.

* * * * *